United States Patent [19]

Plohn et al.

[11] Patent Number: 4,471,229
[45] Date of Patent: Sep. 11, 1984

[54] METHOD AND APPARATUS FOR CONTROLLING A TURBO-GENERATOR SET

[75] Inventors: Gerhard Plohn; Manfred Schuh, both of Erlangen, Fed. Rep. of Germany

[73] Assignee: Siemens Aktiengesellschaft, Berlin and Munich, Fed. Rep. of Germany

[21] Appl. No.: 355,608

[22] Filed: Mar. 8, 1982

[30] Foreign Application Priority Data

Mar. 9, 1981 [DE] Fed. Rep. of Germany ....... 3108915

[51] Int. Cl.³ .................... G06F 15/06; F01K 13/02
[52] U.S. Cl. .................................. 290/40 R; 60/245; 290/2; 415/15
[58] Field of Search ............ 290/2, 40 A, 40 B, 40 C, 290/40 R; 322/14, 15, 17; 317/21; 60/646, 645; 235/151.21, 151; 415/15

[56] References Cited

U.S. PATENT DOCUMENTS 3,999,787 12/1976 Park .................................. 290/40 R
4,027,145 5/1977 McDonald et al. .......... 290/40 R X Primary Examiner—J. V. Truhe
Assistant Examiner—Terry Flower
Attorney, Agent, or Firm—Kenyon & Kenyon

[57] ABSTRACT

In a power control for a turbo-generator, the acceleration power of the difference between the mechanical power supplied to the turbo-generator set and the power delivered by it is determined and, if the supplied power preponderates, a correction signal directed toward closing control valves is fed to the power control by means of a valve positioning controller, Thereby, the power control need not be disconnected in the event of disturbances such as load shedding and network short circuit, but can practically remain engaged continuously.

7 Claims, 3 Drawing Figures

4,471,229

METHOD AND APPARATUS FOR CONTROLLING A TURBO-GENERATOR SET

BACKGROUND OF THE INVENTION

This invention relates to turbo-generators in general and more particularly to a method for controlling a turbo-generator set including a generator, a turbine and a power control which delivers a control signal for control valves preceding and supplying steam to the turbine.

The customary method of controlling turbo-generator sets includes replacing the power control whose output signal acts on the control valves releasing the live steam, in the case of disturbances, such as load shedding or network short circuits, with the speed control required for starting the turbine. This cushions the speed increasing influence of these disturbances. In addition to the closing command of the speed control, a closing signal is fed directly into the hydraulic control system for a constant time by means of a load relay (German journal "VGB Kraftwerkstechnik 59" no. 6, June 1979, pp 467-472). It is a disadvantage of this method that, in the case of load shedding, a considerable speed acceleration is unavoidable and that, in the case of a network short circuit, after its correction, the reconnection of the power control takes place at a state of unbalance, so that power hunting of the turbo-generator set which may occur is usually further amplified.

It is an object of the present invention, in controlling turbo-generator sets of this general type, to avoid these disadvantages and to counteract the mentioned disturbances faster and more effectively.

SUMMARY OF THE INVENTION

According to the present invention this problem is solved by comparing the mechanical power supplied to the turbine at any point in time with the power delivered by it and, if the supplied mechanical power exceeds the delivered power by a predeterminable limit, bringing into play a corresponding correction signal aimed at closing the control valves. The basic idea of the method according to the present invention therefore comprises detecting the cause of a speed acceleration of the turbine, namely, the preponderance of the mechanical power supplied to it over the delivered electric power at the earliest possible instant and deriving therefrom a closing signal directed toward eliminating this power excess and of such magnitude that the valve position is matched to the delivered generator power that occurs at any time.

DETAILED DESCRIPTION

Figure 1:
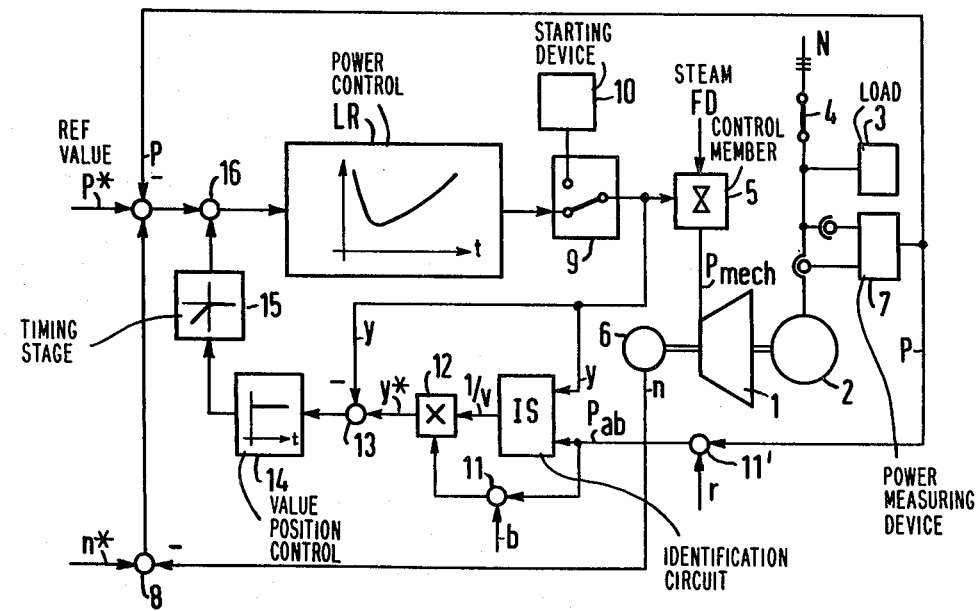
FIG. 1 is a block diagram of a first control system according to the present invention.

In FIG. 1 a turbine 1 is coupled mechanically to an electric generator 2 which supplies loads 3 with electric power and feeds, via a network coupling breaker 4, into a network designated as N. Live steam FD is fed via control valves 5, in an amount corresponding to the degree of opening thereof, which degree is determined by a control signal y. The control signal y is supplied by a power control LR which is acted upon by the difference between the adjustable reference value P* and the actual value P determined by means of an active power measuring device 7, measuring delivered generator power. For the customary frequency dependent power correction (static formation), the input of the power control is also supplied with the difference, formed in an adding stage, e.g., at a summing junction, between a predeterminable speed value n* (as a rule a value corresponding to the frequency of the network) and a variable n which is proportional to the turbine speed and which is supplied by a tachometer generator 6 coupled mechanically to the turbine 1. The power control LR, the design of which is not shown specifically, may have integrating characteristics and is otherwise adapted to the control loop consisting of the generator, turbine, and the network. Via a switch 9, during the starting of the turbine, up to synchronization with the network, the control signal y is supplied by the output of a starting device 10, likewise not shown specifically, for instance, a speed control. The arrangement described so far coincides with the state of the art mentioned at the outset and can be constructed in accordance therewith.

To an identification circuit IS, the control signal y and a signal $P_{ab}$ are now fed. Signal $P_{ab}$ is a value corresponding to the sum of generator power P and a constant r which corresponds to friction losses of the turbo-generator set. The signal $P_{ab}$ thus is a measure of the total power delivered by the turbo-generator set. The identification circuit forms, for stationary operating points, i.e. for operating states in which the generator speed is constant and therefore, the mechanical power supplied to the turbine corresponds, except for the friction losses, to the active generator power P delivered, the quotient of the control signal y and the output variable $P_{mech}$ of control member 5 and is in a position to maintain this value even if there is hunting of the load. The output variable 1/V of the identification circuit IS corresponds to the reciprocal of the gain of the control member 5 according to the relationship $P_{mech} = V\, y$ or $y = 1/V \cdot P_{mech}$. The gain V is a function of several parameters, in particular of the live steam pressure and the number of control valves in operation at any one time. The value P, which is proportional to the active power, is fed to an adding stage, where the quantity r is added to it to form $P_{ab}$. $P_{ab}$ is fed to another adding stage 11, the second input of which is acted upon by a constant quantity b, and the output of which is connected to the one input of a multiplier 12, the second input of which is connected to the output of the identification circuit IS.

The output signal y* of the multiplier is used as the reference value for a valve position control, in that it is compared in adding stage 13 with the actual control signal y, and the difference is fed to a valve position control 14. The output signal of the valve position control 14 acts via a timing stage 15 and an adding stage 16 on the input of the power control LR, the limiting stage 15 suppressing signals of positive polarity. The valve position control 14 is therefore engaged, i.e., is effective only in a correcting sense in the input of the power control LR, if the control signal y is larger than the reference value y* of the positioning control determined by the output of the multiplier 12.

To explain the operation of the aparatus according to the present invention, shown in FIG. 1, the signal b present at the second input of the adding stage 11 will first be assumed to be zero and the friction losses of the turbo-generator set will be ignored (r=0). Then, a control signal y* is simulated at the output of multiplier 12, which signal corresponds exactly to the value which the control signal y would have to have so that the active electric power P delivered by the generator is fed to the turbine as mechanical power $P_{mech}$. For stationary operating points (n=constant) the actual control signal y and the simulated control signal y* coincide completely under the conditions above Because the identification circuit IS retains the value of the control stage amplification, or its reciprocal value 1/V, determined by it for a stationary operating point, even for a period of time after leaving this stationary operating point, any difference between the output signal y* of the multiplier 11 and control signal y corresponds to a part of the mechanical power $P_{mech}$ not converted to delivered generator active power but into acceleration power, which must be noticed, for instance, upon a sudden disappearance or reduction of the generator active power of the turbo-generator set, as a corresponding increase of the speed. By monitoring the output signal of the adding stage 13, it can therefore, in principle, be recognized, at the earliest possible time, that an acceleration process will start and provision can be made furthermore, by quantitative evaluation and negative feedback of this signal which is proportional to the acceleration power to the control stage input, so that the opening of the valves is adapted to the active power delivered at any time and therefore an excessive increase in the speed is avoided.

The simulated positioning signal y* prescribes exactly the value for the actual positioning signal which would have to be set to bring about equilibrium between the supplied mechanical power and the delivered electric power. The gain of the valve positioning control 14, which is shown in the embodiment of FIG. 1 and is realized as a proportional control, e.g., an amplifier, should be chosen large enough that the correction influence getting to the input of the power control LR via the timing stage 15 and the adding stage 16, in the case of load shedding or a network short circuit, is larger than the quantity which acts in these disturbance cases in the opposite sense, i.e., the quantity which is formed from the difference between the reference power value P* and the actual power value P and which acts on the second input of the adding stage 16.

It has been assumed that, as long as the supplemental quantity b fed to the adding stage 11 is zero, the valve positioning control 14 will also resist or make impossible an increase of the control signal y which is required for an operationally intended increase of the generator power P to be delivered. Therefore, the supplemental quantity b, which essentially corresponds to the actual value of the difference in power, i.e., the amount by which the supplied mechanical power can be larger than the instantaneously delivered active power of the generator 2, is additively fed to the adding stage 11. This limit b is only a fraction, for instance, 10%, of the rated generator power. The control signal y is reduced to a value corresponding to this fraction of the rated generator power. In the case of above mentioned disturbances, i.e., load shedding and network short circuit (P=0) and in the case of partial load shedding, the control signal y is brought to a value such that 10% more power than is delivered is always supplied.

In principle, it can therefore be ensured by the apparatus according to FIG. 1 that, immediately upon a sudden load reduction of the generator, a closing motion of the control valves is initiated which lasts until an amount of mechanical power which is only slightly above the power just being delivered, determined by the limit b, is fed to the turbine. The speed increases resulting therefrom can then be intercepted immediately by the output signal of the adding stage 8, whereby further closing of the control valves 5 is then caused.

In realizing the method according to the present invention, cases can occur where the gain of the valve positioning control cannot be chosen high enough, considering the dynamics and stability, to always ensure that, in the case of load reductions, this output signal directed toward closing of the control valves predominates. In the embodiment of the invention shown in FIG. 2, a PI control 17 is therefore used as a valve control. If the control signal y predominates over the reference value y*, it changes its output signal in the negative direction until control balance is achieved, i.e., y=y*. If on the other hand the simulated control signal y* which is used as the reference value predominates, then the output signal of the PI (proportional integral) control 17 no longer acts on the power control LR, but, via the limiting stage 18, in the negative feedback sense onto input of the control 17. The output signal of the PI control 17 changes until the output signal of the limiting stage 18 has a magnitude corresponding to the value b/V. The output signal of the PI control 17 acts on the input of an adding stage 19, the second input of which is connected via a proportional member 20 to the output of the limiting stage 22. In the event of excess speed, an amount proportional to this excess is added in this manner to the output signal of the control 17. It can be shown that due to the integral behavior of the PI control 17 or the power control LR, an influence on the control signal y is exerted by the output signal of the proportional member 20 which is proportional to the acceleration of the turbine. This provides additional safety against running away of the turbine in case of load relief.

In cases where delay stages are arranged in the functional chain extending up to the positioning number, it may be found advantageous to also give delay characteristics to the proportional member 20.

Since negative control signals y are not realizable, it is also not advantageous to set in, for the time when active power is taken up by the generator, the corresponding negative control reference value y*. Therefore, a limiting stage 21 is provided which suppresses signals P of negative polarity at the input of the adding stage.

Figure 2:
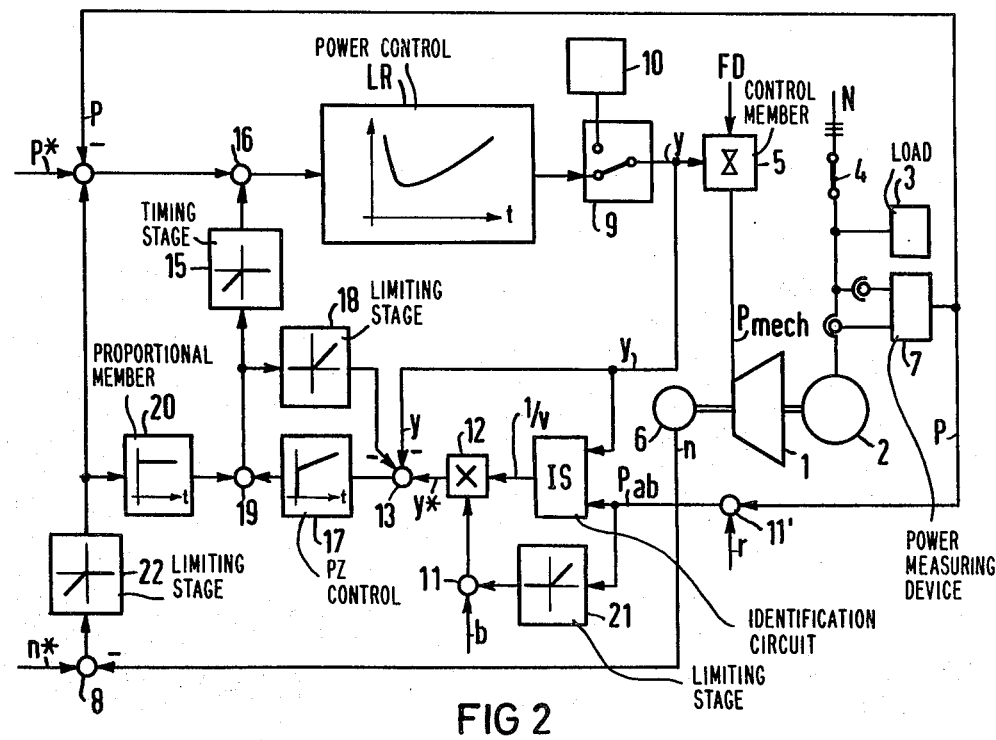
FIG. 2 is a similar view of a second embodiment of a control system according to the present invention.
Figure 3:
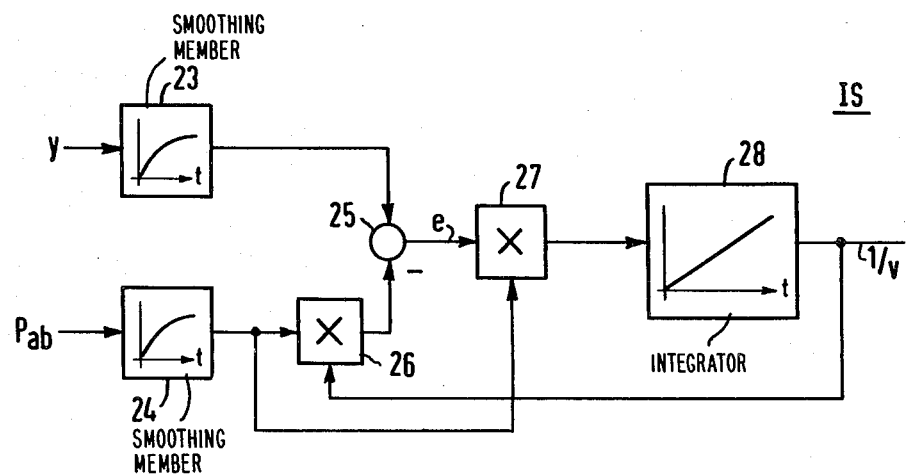
FIG. 3 is a block diagram of an identification circuit for use in the control systems of FIG. 1 and FIG. 2.

FIG. 3 shows a simple possibility for realizing the identification circuit IS in FIGS. 1 and 2. The control signal y acts, via a smoothing member 23, i.e., a filter, on an adding stage 25, to the other input of which the quantity $P_{ab}$, which is proportional to the delivered power, is fed, likewise via a smoothing member 24 as well as a multiplier 26. The output signal e of the adding stage 25 is connected via a second multiplier 17 to the input of the multiplier 26 which follows the smoothing member 24. The purpose of the smoothing members 23 and 24 is to see that only d.c. components of the quantities y and $P_{ab}$ are processed by the identification circuit IS. The output signal 1/V of the integrator 28 will change until its input variable disappears, i.e. $y - P_{ab}/V = 0$ or $1/V = y/P_{ab}$, whereby the reciprocal value 1/V of the gain V is identified in the stationary condition ($P_{ab}=P_{mech}$). The use of the multiplier 27 further results in the advantage that this identification is accomplished faster, the larger, the generator power P.

Seen overall, the possibility is therefore opened up to leave the power control continuously engaged in all occurring operating cases including the disturbances caused by load shedding and network short circuit, if a valve positioning control in accordance with the present invention is associated with the power control.

What is claimed is:

1. A method for controlling a turbo-generator set including a generator and a turbine, and having a power control which delivers a control signal for control valves feeding the turbine with steam, comprising comparing the mechanical power supplied to the turbine with the actual power delivered by the turbo-generator set, and, for the case where the supplied mechanical power exceeds the delivered power by a predeterminable limit, bringing to bear a corresponding correction signal directed towards closing of the control valves.

2. The method according to claim 1, comprising forming an acceleration dependent signal from the positive difference between the turbine speed and a predeterminable speed and bringing said signal to bear as a further correction signal which is also directed toward closing the control valves.

3. The method according to claim 1 or 2, comprising forming a reference value for a valve positioning control equal to the quotient of the control signal divided by the mechanical power increased by a predetermined limit amount.

4. Apparatus for controlling a turbo-generator set which includes a generator and a turbine and has a power control which controls the control valves feeding the turbine, comprising:
   (a) an identification circuit having as inputs a control signal and a signal proportional to the delivered power adapted to form a control signal output;
   (b) means to increase said signal proportional to delivered power by a limit;
   (c) a multiplier having as a first input the output or said identification circuit and, as a second input, said power proportional signal increased by a limit;
   (d) a valve positioning control with intergrating behavior having the output signal of said multiplier as a reference value input;
   (e) means forming a signal proportional to the positive difference between the actual turbine speed and a reference speed;
   (f) an adding stage having the output signal of said valve positioning control as one input, and said signal which is proportional to the positive difference between the turbine speed and the predetermined speed as second input; and
   (g) first and second limiting stages having the output of the adding stage as inputs, one limiting stage having its output connected to the input of the power control and adapted to pass only input signals of such polarity that are directed toward closing of the control valves, the output signal of the other limiting stage acting in a negative feedback sense on the input of the valve positioning control, and passing only input signals of the other polarity.

5. Apparatus according to claim 4, and further including a proportional member coupling said signal proportional to the positive difference to said adding stage.

6. Apparatus according to one of the claims 4 or 5, wherein said identification circuit comprises:
   (a) a first delay stage having said control signal as an input;
   (b) a second delay stage having said power proportional signal as an input;
   (c) first means to multiply the output of said second delay stage by the output of said identification circuit;
   (d) means forming the difference between the output of said first delay stage and said first means to multiply;
   (e) an integrator providing as its output the output of said identification circuit; and
   (f) means coupling said difference as the input to said integrator.

7. Apparatus according to claim 6, wherein said means coupling comprise second means to multiply said difference by the output of said second delay stage.

* * * * *